US011986976B2

(12) United States Patent
Stefani et al.

(10) Patent No.: US 11,986,976 B2
(45) Date of Patent: May 21, 2024

(54) DEVICE AND METHOD FOR MASS DECORATION OF CERAMIC PRODUCTS

(71) Applicant: SYSTEM CERAMICS S.P.A., Fiorano Modenese (IT)

(72) Inventors: Franco Stefani, Sassuolo (IT); Mohamed Ouassif, Sassuolo (IT); Andrea Annovi, Corlo di Formigine (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 353 days.

(21) Appl. No.: 17/263,249

(22) PCT Filed: Jul. 30, 2019

(86) PCT No.: PCT/IB2019/056485
§ 371 (c)(1),
(2) Date: Jan. 26, 2021

(87) PCT Pub. No.: WO2020/026136
PCT Pub. Date: Feb. 6, 2020

(65) Prior Publication Data

US 2021/0162627 A1 Jun. 3, 2021

(30) Foreign Application Priority Data

Aug. 1, 2018 (IT) ........................ 102018000007720
Aug. 1, 2018 (IT) ........................ 102018000007729

(51) Int. Cl.
*B28B 13/02* (2006.01)
*B28B 1/00* (2006.01)
(Continued)

(52) U.S. Cl.
CPC ............ *B28B 13/022* (2013.01); *B28B 1/005* (2013.01); *B28B 5/021* (2013.01); *B28B 7/46* (2013.01);
(Continued)

(58) Field of Classification Search
None
See application file for complete search history.

(56) References Cited

U.S. PATENT DOCUMENTS 4,632,849 A 12/1986 Ogawa et al.
8,337,947 B2 12/2012 Camorani
(Continued)

FOREIGN PATENT DOCUMENTS

CN 101032831 A 9/2007
CN 101804664 A 8/2010
(Continued)

OTHER PUBLICATIONS

Office Action issued Jul. 15, 2022 in Indian Patent Application No. 202127001634, 5 pages.
(Continued)

*Primary Examiner* — Jacob T Minskey
*Assistant Examiner* — Caroline Beha
(74) *Attorney, Agent, or Firm* — Pearne & Gordon LLP; J. Gregory Chrisman

(57) ABSTRACT

The invention relates to a method for the mass decoration of ceramic products, comprising the following steps: spreading, superposed on one another, a layer (L) of granular or powder material and a decorative layer (3) on a support surface (2); transferring the layer (L) from the support surface (2) to an accumulation belt (T1), contiguous and aligned to the support surface (2), which is located at a lower height than the support surface (2), wherein the accumulation belt (T1) is mobile in advancement at a speed that is
(Continued)

different from the advancement speed of the support surface (2), so that a variation in the thickness and longitudinal extension of the layer (L) is produced; pressing the layer (L) and the decorative layer (3).

14 Claims, 4 Drawing Sheets

(51) Int. Cl.

| | |
|---|---|
| ***B28B 5/02*** | (2006.01) |
| ***B28B 7/46*** | (2006.01) |
| ***B28B 17/00*** | (2006.01) |
| ***B30B 11/00*** | (2006.01) |
| ***B30B 15/30*** | (2006.01) |

(52) U.S. Cl.
CPC ........ *B28B 17/0081* (2013.01); *B30B 11/005* (2013.01); *B30B 15/302* (2013.01)

(56) References Cited

U.S. PATENT DOCUMENTS

| | | | | |
|---|---|---|---|---|
| 9,289,973 | B2 | 3/2016 | Stefani et al. | |
| 9,789,509 | B2 | 10/2017 | Stefani et al. | |
| 2002/0167106 | A1* | 11/2002 | Acerbi | B28B 11/001 264/109 |
| 2004/0219339 | A1* | 11/2004 | Dempsey | B32B 27/20 428/204 |
| 2009/0010682 | A1 | 1/2009 | Camorani | |
| 2015/0239236 | A1 | 8/2015 | Stefani et al. | |
| 2016/0009601 | A1* | 1/2016 | Han | C04B 35/62695 501/141 |
| 2017/0265481 | A1* | 9/2017 | LaMantia | A21D 13/60 |
| 2018/0250846 | A1 | 9/2018 | Stefani | |
| 2021/0276221 | A1* | 9/2021 | Bosi | B44F 9/04 |

FOREIGN PATENT DOCUMENTS

| | | | | | |
|---|---|---|---|---|---|
| CN | 102303357 | A | | 1/2012 | |
| CN | 102303357 | B | * | 6/2013 | |
| CN | 103481358 | A | | 1/2014 | |
| CN | 207310207 | U | * | 5/2018 | B28B 13/02 |
| EP | 150048 | A2 | | 7/1985 | |
| EP | 1529614 | A1 | | 5/2005 | |
| EP | 1986830 | B1 | | 11/2015 | |
| EP | 2897773 | B1 | | 6/2016 | |
| EP | 2898374 | B1 | | 6/2016 | |
| WO | 2017051275 | A1 | | 3/2017 | |
| WO | WO-2017051275 | A1 | * | 3/2017 | B28B 13/02 |

OTHER PUBLICATIONS

Office Action issued Nov. 26, 2021 in Chinese Patent Application No. 201980050997.2, 10 pages.

English translation of CN102303357A, 7 pages (this Chinese reference itself is already of record along with an English abstract).

* cited by examiner

DEVICE AND METHOD FOR MASS DECORATION OF CERAMIC PRODUCTS

The present invention relates to a device and a method for mass decoration of ceramic products.

In particular, the invention relates to the production of decorated or coloured ceramic tiles.

In the production of ceramic tiles, decoration is applied only in the surface part of the tile using ceramic inks that are normally transferred in the form of small drops with inkjet printheads. The amounts deposited with the present technologies do not enable the ink, and thus the image to be reproduced, to be transferred into the structure of the ceramic product; rather, the decoration remains present only on the surface of the tile for a very limited thickness. To remedy this drawback, some technologies enable colourings to be obtained within the mass of the tile by means of the coloured granular material used to produce the tile itself. In this manner it is possible to obtain tiles with coloured veins passing inside the tile. However, these technologies guarantee neither the repeatability nor the precision necessary to obtain products that can be compared to the variegated and random internal structure that natural stones, such as, for example marble, can have. Ceramic tiles are presently produced and sold which have a mass colouring, i.e. a colouring that extends through the entire thickness and in the entire mass of the tiles themselves.

For the production of mass coloured ceramic tiles, the use of granular or powder materials is presently known; they are typically in atomised form and coloured during the production process. The atomised materials are spread in the form of a layer that is subsequently pressed and subjected to a firing process, according to known procedures, in order to obtain the ceramic tiles. The ceramic tiles can then undergo further colouring or surface decoration steps.

The process for producing coloured atomised materials substantially entails grinding raw materials inside mills of a known type. Such mills produce the so-called slip, i.e. an aqueous suspension of ceramic material mixed and ground inside the mills themselves. The necessary colourants are mixed with the slip before it is fed to an atomiser. Essentially, the pipe feeding the slip to the atomiser is equipped with a colourant feed device. The atomiser is thus fed with a coloured slip. This means that every time the colouring is changed it is necessary to clean the whole atomiser very thoroughly to avoid contaminations which can cause the colouring obtained to deviate from the expected result.

Furthermore, on exiting the atomiser, atomised materials of different colour must be stored separately from one another, typically each in its own dedicated silo. This results in the occupation of large spaces for the storage of the atomised materials, as well as a considerable complication of the overall plant logistics.

The object of the present invention is to offer a device and a method which enable a decoration within the thickness of the tile, i.e. the production of decorations extending through the entire thickness and the entire mass of the tiles.

Another advantage offered by the present invention is that it enables a considerable simplification of systems for the production of atomised materials.

Additional features and advantages of the present invention will become more apparent from the following detailed description of one embodiment of the invention, illustrated by way of non-limiting example in the appended figures in which:

FIG. 1 shows a schematic view of a device according to the present invention;

FIG. 2 schematically shows a product obtained by applying a possible embodiment of the method;

FIG. 3 schematically shows the product of FIG. 2 in the section plane II-II;

Figure 1:
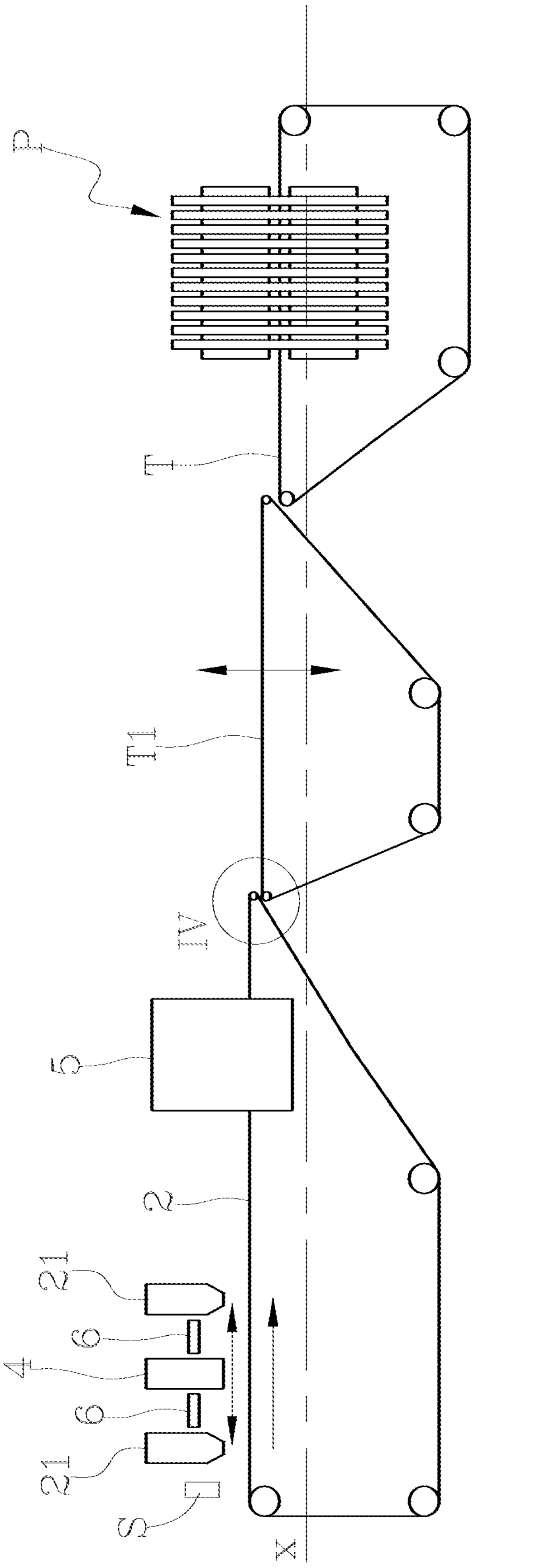
Figure 2:
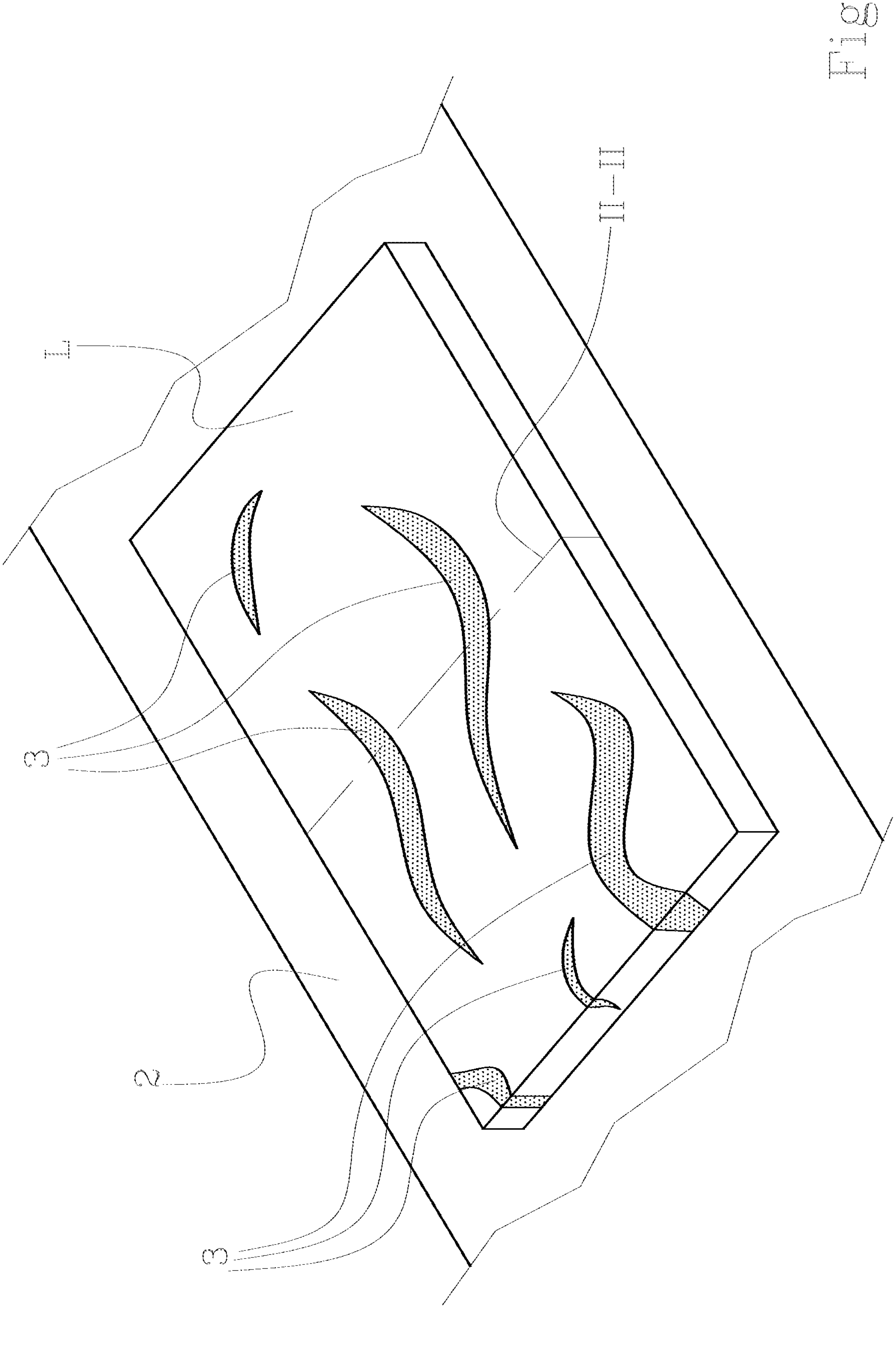
Figure 3:
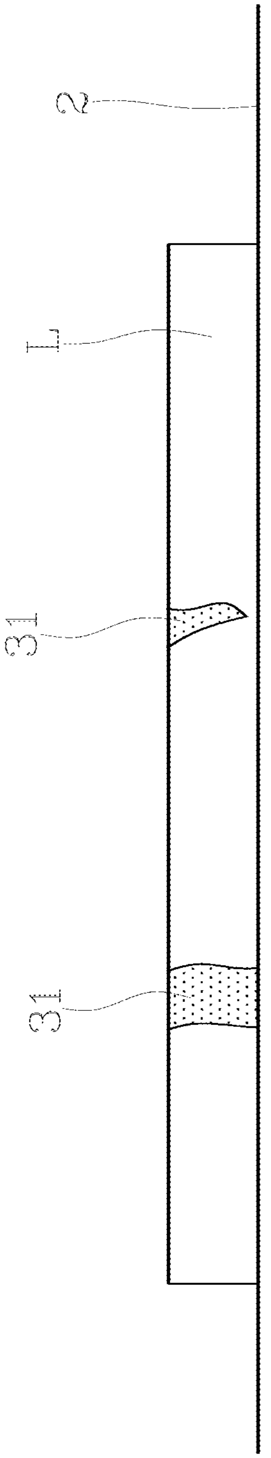

The method according to the present invention particularly relates to the production of ceramic tiles.

The method comprises, together with other steps, spreading a layer (L) of granular powder material on a substantially horizontal support surface (2). The layer (L), for example, is a layer of atomised ceramic material.

The layer (L) can be spread by means of a distributor device (21), of a type known to the person skilled in the art. For example, the distributor (21) comprises a hopper or another discharge device provided with a lower opening through which the granular or powder material can be deposited on the underlying support surface (2).

Motor means are provided to produce a relative motion between the support surface (2) and the distributor device (21) along at least a main direction (X). This enables the deposition of the granular or powder material in the form of a layer (L). Various solutions within the grasp of the person skilled in the art are possible. For example, it is possible to actuate the support surface (2) or only the distributor (21) in sliding movement, or else it is possible to move both at different speeds. The possible solutions are not represented in detail, as they are known to the person skilled in the art. In the description that follows, reference will be made to a preferred solution in which the support surface (2) is mobile along an advancement direction (X).

The method according to the present invention comprises spreading, superposed on one another, a layer (L) of granular or powder material and a decorative layer (3) on a support surface (2). The decorative layer (3) could be spread on the support surface (2), and subsequently be covered by the layer (L), or the decorative layer (3) could be applied on the layer (L) after the latter has been spread on the support surface (2). It would also be possible to spread a lower decorative layer (3) on the support surface (2), spread the layer (L) on the lower decorative layer (3) and subsequently apply the decorative layer (3) on the layer (L).

In a possible embodiment of the method, the decorative layer (3) is dry, i.e. made up of granular or powder material. In such a case, the application of the decorative layer (3) takes place by means of a dispensing device (4) structured so as to enable the controlled deposition of a decorative layer formed from a granular or powder material, for example an atomised ceramic material or colouring oxides or ceramic pigments. The dispensing device (4) can be of the digitally controlled type. Examples of dispensing devices suitable for depositing a decorative granular or powder layer on the layer (L) are described in the publications EP1986830, EP2897773, EP2898374.

In another possible embodiment of the method, the decorative layer (3) is wet, i.e. it comprises a liquid colouring material. In this case, the decorative layer (3) can be applied by means of a digitally controlled dispensing device (4). Preferably, but not necessarily, the dispensing device (4) is structured so as to enable the controlled deposition of punctiform drops of colourant, in controlled positions. For example, the dispensing device (4) is of the drop-on-demand type, such as an ink-jet or valve-jet printhead.

In a possible embodiment, the dispensing device (4) comprises one or more inkjet bars, each of which is configured to apply a single colour.

All the devices indicated are well known in the art and will therefore not be described in further detail.

The liquid colouring material comprises, for example, an ink with ceramic pigments or a soluble salt ceramic ink or ceramic glaze, already widely known in the art of decorating ceramic tiles. By applying the decorative layer (3) in the liquid form it is possible to obtain a colouring or a mass decoration of the layer (L). The liquid colourant, in fact, penetrates and spreads through the thickness of the layer (L).

The application of the decorative layer (3) can be implemented by producing a relative motion between the dispensing device (4) and the support surface (2). To this end, motor means can be provided to translate the dispensing device (4) relative to the support surface (2). As with the distributor device (21), also in the case of the dispensing device (4) it is possible to translate only the support surface (2), only the dispensing device (4) or combine a translation of both devices. In a possible solution, the dispensing device (4) can be integral with the distributor device (21) and be moved integrally with the latter.

The method according to the present invention comprises a step of transferring the layer (L) from the support surface (2) to an accumulation belt (T1), contiguous and aligned to the support surface (2), which is at a lower height than the support surface (2). The accumulation belt (T1) is mobile in advancement at a speed that is different from the advancement speed of the support surface (2), so that a variation in the thickness and longitudinal extension of the layer (L) is produced.

In the embodiment represented, the accumulation belt (T1) is contiguous and aligned to the support surface (2). Essentially, the accumulation belt (T1) is located at a slightly lower height than the support surface (2) and has an inlet end located below the outlet end of the support surface (2), so that the layer (L) can pass from the support surface (2) to the accumulation belt (T1) by undergoing a small drop downwards, as described in the publication WO2017051275. The configuration and the relative position of the support surface (2) and of the accumulation belt (T1), which enable the passage of the layer (L) from the former to the latter with a small drop, is particularly advantageous as it does not produce uncontrolled deformations of the decorative layer (3), notwithstanding the homogeneous modifications that are produced in the event that the advancement speed of the support surface (2) and of the accumulation belt (T1) are different. In other words, in the case where the advancement speeds of the support surface (2) and of the accumulation belt (T1) are equal, the decorative layer (3), when passing from the former to the latter with a small drop, will not undergo deformations.

The support surface (2) and the accumulation belt (T1) are both horizontal, also in the end zone in which they are partially overlapping and the passage of the layer (L) from the former to the latter takes place. Furthermore, the passage of the layer (L) from the support surface (2) to the accumulation belt (T1) is direct, with a small drop, i.e. no connecting chutes or descending portions that could deform the decorative layer (3) are envisaged.

Figure 4:
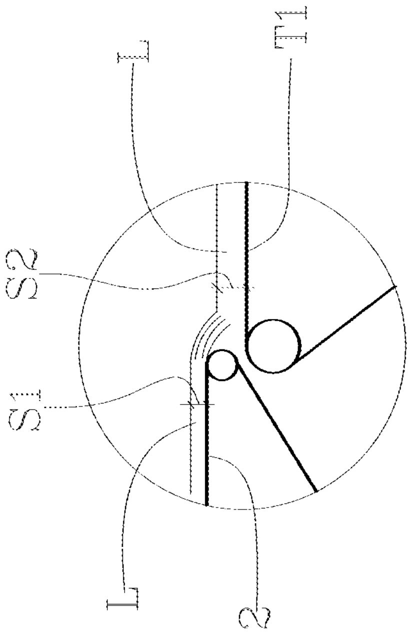
FIG. 4 shows an enlargement IV of FIG. 1 in a possible step of the method according to the present invention.

For example, by adopting for the support surface (2) a speed that is higher than that of the accumulation belt (T1), it is possible to increase the thickness of the layer (L) transferred onto the accumulation belt (T1), passing from an initial thickness (S1) that is smaller than a greater final thickness (S2) and obviously reducing the extension in the longitudinal direction, i.e. the extension measured along a direction parallel to the advancement direction (FIG. 4). This is because, in passing from the support surface (2) to the accumulation belt (T1), the material forming the layer (L), as it slows, tends to accumulate, thus increasing the thickness of the layer (L) deposited on the accumulation belt (T1) and consequently reducing the length of the layer (L) on the accumulation belt (T1).

Furthermore, if it is desired to obtain a layer of pre-established thickness to be fed to the press, it is possible to spread on the support surface (2) a layer (L) of a smaller thickness than the pre-established one. The thickness of the layer (L) on the accumulation belt (T1) can be increased up to a pre-established value through the passage from the support surface (2) to the accumulation belt (T1), which moves with a lower advancement speed than the support surface (2).

The smaller thickness of the layer (L) on the support surface (2) enables the decorative layer (3) to penetrate by a larger fraction of the thickness itself, until occupying the entire thickness of the layer (L). For example, it is possible to produce a decorative layer (3) that reproduces veins extending through the entire thickness of the layer (L). The smaller thickness of the layer (L) can be subsequently made up for, i.e. increased up to a pre-established extent, through the slower speed of the accumulation belt (T1). The increase in the thickness of the layer (L) does not modify the depth of the decorative layer (3) in relation to the thickness of the layer (L). In other words, a condition in which the decorative layer (3) or a part thereof extends through the entire thickness of the layer (L) on the conveying surface (2) is also maintained after the passage of the layer (L) on the accumulation belt (T1) at a lower advancement speed. This makes it possible to produce decorations extending through the entire thickness of the layer (L), also in the case of relatively high final thicknesses of the layer (L).

In the case where the support surface (2) and the accumulation belt (T1) move with the same advancement speed, the layer (L) will not change its thickness in the passage from one to the other. And, obviously, in the case where the accumulation belt (T1) moves with an advancement speed that is higher than the advancement speed of the support surface (2), the layer (L) will reduce its thickness in the passage from the support surface (2) to the accumulation belt (T1).

If different advancements speed are used for the support surface (2) and the accumulation belt (T1), the decorative layer (3) will change in the passage of the layer (L) from the support surface (2) to the accumulation belt (T1). In other words, the decorative layer (3) has an initial configuration, obtained after the spreading thereof on the support surface (2), and a final configuration, which is determined following the passage from the support surface (2) to the accumulation belt (T1). If the support surface (2) has a higher advancement speed than the accumulation belt (T1), the decorative layer (3) will shorten along a direction parallel to the advancement direction.

The decorative layer (3) is thus configured and applied with an initial longitudinal extension, measured along the advancement direction, which is different to a predicted final longitudinal extension, so as to compensate for the variation of the longitudinal extension of the layer (L) due to the different advancement speeds of the support surface (2) and of the accumulation belt (T1).

Figure 5:
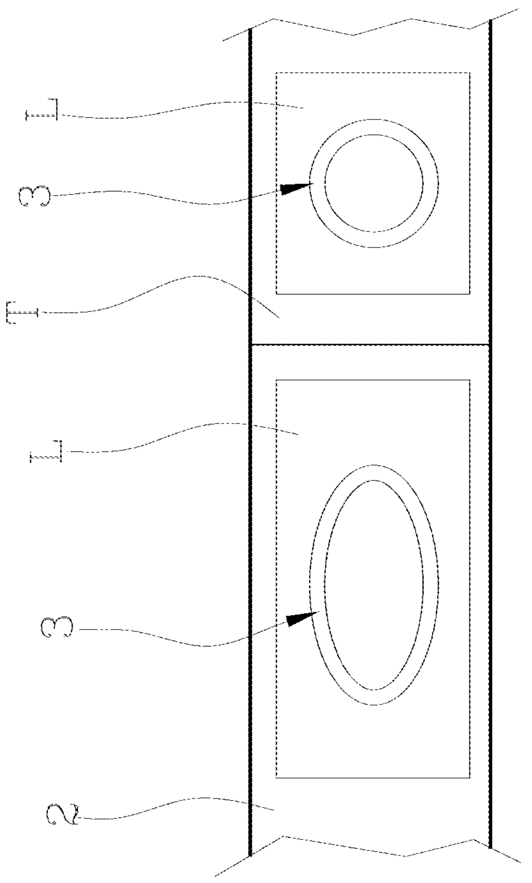
FIG. 5 shows a schematic plan view of an embodiment of the method according to the present invention.

In other words, the decorative layer (3), by means of the dispensing device (4), is spread taking account of the change that will be determined in the passage of the layer (L) from the support surface (2) to the accumulation belt (T1). For example, in the case where the conveyor surface (2) advances at a higher speed than the accumulation belt (T1), the decorative layer (3) must be configured and applied with an initial extension, measured along the advancement direction, which is greater than the predicted final extension. For example, in the case where the final configuration predicted for the decorative layer (3) is a circle, the decorative layer (3) is spread on the layer (L) with an initial oval configuration, in which a major axis, parallel to the advancement direction of the layer (L), has a length that is greater than the diameter of the predicted final circular configuration (FIG. 5).

The adaptation of the configuration of the decorative layer (3) to the difference in speed between the support surface (2) and the accumulation belt (T1) can be achieved through the control of the dispensing device (4). In particular, in the case of a digitally controlled dispensing device (4), the configuration of the decorative layer (3) is adapted by means of a control module provided with a processing algorithm which, once the final configuration predicted for the decorative layer (3) and the difference in speed between the support surface (2) and the accumulation belt (T1) are known, modifies the initial longitudinal extension of the decorative layer (3), during the step of spreading on the support surface (2), relative to the predicted final longitudinal extension, increasing or reducing it in the case where, respectively, the advancement speed of the support surface (2) is higher or lower than the advancement speed of the accumulation belt (T1).

By means of the dispensing device (4), the decorative layer (3) can be applied both uniformly and non-uniformly. Applying it uniformly enables a layer of uniform colour to be obtained over the whole surface of application. Applying the decorative layer (3) non-uniformly enables a pre-established pattern or motif to be reproduced, also using different colours.

For example, by applying the decorative layer (3) using ceramic pigments or colouring oxides in the dry form it is possible to obtain a mass colouring of the layer (L). The dry ceramic colourant applied uniformly, first on the support surface (2) and subsequently over the layer (L), is distributed homogeneously around the granular material of the layer (L), colouring it through its entire thickness. Following the application of one or more of the decorative layers described, after having been transferred from the support surface (2) to the accumulation belt (T1) the layer (L) is subjected to a pressing step. The pressing step, in turn, is followed by the normal steps of the ceramic tile production process, which comprise, for example, one or more steps of trimming and/or dividing the layer (L) into portions of a smaller size, and of firing the layer (L) or portions of a smaller size obtained therefrom.

It is further possible to include a step of controlling and adjusting the moisture of the layer (L) prior to pressing. The moisture of the layer (L) influences, in fact, the degree of compacting obtainable through pressing, and it can therefore be advantageous to control and adjust it. The control and adjustment of the moisture of the layer (L) can be performed by means of a specific device (5), for example a dryer.

FIG. 1 schematically represents a possible embodiment of a device for implementing the method according to the present invention.

The device comprises a support surface (2), on which it is possible to spread the layer (L). In the embodiment represented, the support surface (2) is mobile along an advancement direction (X). For example, the support surface (2) is in the form of a motor-driven belt known to the person skilled in the art.

The use of a mobile support surface (2) is useful for actuating motion relative to a distributor (21) for spreading the layer (L) and for actuating the motion relative to the dispensing device (4) for the application of the decorative layer (3). It would be possible in any case to provide the distributor (21) and/or the dispensing device (4) with respective motor means to enable a translation relative to the support surface (2).

The support surface (2) can further be used to convey the layer (L) to the press (P).

The device further comprises a distributor (21) configured to deposit the layer (L) on the support surface (2). As already mentioned, the distributor (21) is a device known to the person skilled in the art. For example, the distributor (21) can comprise a hopper or another discharge device provided with a lower opening, access to which can be controlled by means of a barrier movable between an open position, wherein it allows the downward discharge of the granular or powder material, and a closed position, wherein it holds back the granular or powder material, preventing the discharge thereof.

The dispensing device (4) can be placed above the support surface (2). As already indicated, the dispensing device (4) is preferably of the digitally controlled type. Preferably, but not necessarily, the dispensing device (4) is structured so as to enable the controlled deposition of punctiform drops of colourant, in controlled positions. For example, the dispensing device (4) is of the drop-on-demand type, such as an ink-jet or valve-jet printhead, configured to emit drops of colourant.

An advantage offered by a dispensing device (4) of the above-described type is the possibility of controlling with precision the amount of ink or liquid colourant transferred onto the layer (L), either as a uniform layer or full field or as a graphic decoration. For example, the amount by weight of colourant transferred can range from a minimum of 50 grams to a maximum of 1500 grams per square metre of surface area of the layer (L) to be coloured or decorated. In practical terms, the amount of colourant that can be deposited on the layer (L) can be digitally controlled. As is well known, these printing devices are capable of dispensing a number of different colours. All of the devices indicated are well known in the art and will thus not be described in further detail. It is further possible to use two or more dispensing devices (4) of the above-described type.

The device according to the present invention can be further provided with a heating device (6) configured to heat the layer (L) following the application of the decorative layer (3). In a possible embodiment, the heating device (6) can be placed above the support surface (2), next to the dispensing device (4), for example between the distributor (21) and the dispensing device (4), or downstream of the dispensing device (4). It would also be possible to dispose two heating devices (6) at the two sides of the dispensing device (4). The heating device (6) is configured to carry out the step of heating the layer (L), which is aimed at drying the whole layer (L) of decorated powder uniformly. As already noted, the heating device (6) can comprise one or more infrared lamps.

As already pointed out, the use of an accumulation belt (T1) distinct from the support surface (2) enables the advancement speed to be regulated independently of the advancement speed of the support surface (2). This makes it possible to regulate and/or vary the thickness of the layer (L)

by transferring the layer (L) from the support surface (2) to the accumulation belt (T1). The motor means of the accumulation belt (T1) comprise, for example, a torque motor, which has very uniform rotation and enables a precise control of speed.

The accumulation belt (T1) can be further provided with the possibility of translating vertically so as to enable the height of the jump between the support surface (2) and the accumulation belt (T1) to be adjusted. Varying the height of the jump between the support surface (2) and the accumulation belt (T1) makes it possible to vary the thickness of the layer (L) and thus defines a further parameter for controlling thickness together with the difference between the advancement speeds.

The difference between the advancement speeds of the accumulation belt (T1) and the support surface (2) can be set with a ratio comprised between 1 to 2 and 1 to 200. For example, in order to obtain a 30 mm thickness of the layer (L) on the accumulation belt (T1), the speed ratio between the accumulation belt (T1) and the support surface (2) is set at 1 to 10, so that a 3 mm-thick layer (L) will be deposited on the support surface (2). By way of further example, a speed of the support surface (2) of 0.8 m/s can be set and 0.025 m/s for the accumulation belt (T1). In practical terms, if it is desired to obtain a given thickness of the layer (L) on the accumulation belt (T1) prior to pressing, and the difference in speed between the support surface (2) and the accumulation belt (T1) is known, it will be necessary to set a thickness of the layer (L) of material to be deposited on the support surface (2), by means of the distributor (21), so that once it is transferred to the accumulation belt (T1), the final thickness will be the desired one.

The use of an accumulation belt (T1) distinct from the support surface (2) further enables the operating cycle for spreading and decorating the layer (L) to be disengaged from the cycle of pressing the layer (L). In fact, while one layer (L) is being fed to the press (P) by the accumulation belt (T1), a subsequent layer (L) can be formed and decorated on the support surface (2).

The pressing device (P), for example a press, is located downstream of the dispensing device. For example, the pressing device (P) is of the type known in the art through the publication EP150048. The pressing device comprises a conveyor belt (T), equipped with its own motor means independent of the motor means of the conveyor surface (2) and the accumulation belt (T1).

The conveyor belt (T) is mobile along the advancement direction (X), so as to convey the layer (L) to the pressing dies (P1,P2). The pressing dies are disposed along the conveyor belt (T) in such a way as to receive the layer (L) brought forward by the conveyor belt (T). Both the conveyor belt (T) and the layer (L) disposed on the conveyor belt (T) transit between the two dies of the press (P) in such a way that the layer (L) is pressed directly on the conveyor belt (T).

The accumulation belt (T1) is interposed between the support surface (2) and the conveyor belt (T). Similarly, the conveyor belt (T) is at a slightly lower height than the accumulation belt (T1) and has an inlet end located below the outlet end of the accumulation belt (T1), so that the layer (L) can pass from the accumulation belt (T1) to the conveyor belt (T), also undergoing a small drop downwards. The accumulation belt (T1) and the conveyor belt (T) preferably advance at the same speed during the transfer of the layer (L), which thus does not undergo substantial changes.

The device according to the present invention can be provided with a device for controlling and adjusting (5) the moisture of the layer (L), located upstream of the press (P). Said device (5) can be in the form of a dryer. The control and adjustment of the moisture of the layer (L) makes it possible to vary the density of the layer (L) obtainable by pressing.

The invention claimed is:

1. A decoration device for mass decoration of ceramic products, comprising: a support surface (2); a distributor (21), configured to deposit a layer (L) of granular material or powder material on the support surface (2); a pressing device (P), configured to press the layer (L); characterised in that it comprises: a dispensing device (4), configured to apply, on the support surface (2) and/or on the layer (L), a decorative layer (3) of granular material or powder material; an accumulation belt (T1), contiguous and aligned to the support surface (2), which is located at a lower height than the support surface (2), wherein the support surface (2) and the accumulation belt (T1) are positioned upstream of the pressing device and provided with independent motor means and move with different advancement speeds; a control module for the dispensing device (4), provided with a processing algorithm configured to modify an initial longitudinal extension of the decorative layer (3) with respect to a predicted final longitudinal extension according to a difference in the advancement speeds between the support surface (2) and the accumulation belt (T1) upstream of the pressing device.

2. The device according to claim 1, wherein the dispensing device (4) is digitally controlled.

3. The device according to claim 1, comprising motor means for producing a relative motion between the support surface (2) and the dispensing device (4) along at least a main direction (X).

4. The device according to claim 1, comprising motor means for producing a relative motion between the support surface (2) and the distributor (21) along at least a main direction (X).

5. The device according to claim 1, comprising a control and adjusting device (5) for controlling and adjusting the moisture of the layer (L).

6. The device according to claim 1, wherein: the pressing device comprises a conveyor belt (T); the accumulation belt (T1) is interposed between the support surface (2) and the conveyor belt (T); the conveyor belt (T) is located at a slightly lower height than the accumulation belt (T1) and has an inlet end located below the outlet end of the accumulation belt (T1), so that the layer (L) can pass from the accumulation belt (T1) to the conveyor belt (T) by undergoing a small drop downwards.

7. A method for mass colouring of ceramic products, comprising the following steps:

operating the device according to claim 1 for spreading, superposed on one another, the layer (L) of granular or powder material and the decorative layer (3) on the support surface (2);

transferring the layer (L) from the support surface (2) to the accumulation belt (T1), contiguous and aligned to the support surface (2), which is located at a lower height than the support surface (2), wherein the accumulation belt (T1) is mobile in advancement at a speed that is different from the advancement speed of the support surface (2), so that a variation in the thickness and longitudinal extension of the layer (L) is produced;

pressing the layer (L) and the decorative layer (3);

wherein the decorative layer (3) is configured and applied with an initial longitudinal extension, measured along the advancement direction, which is different to a predicted final longitudinal extension, so as to compensate for the variation of the longitudinal extension of the layer (L) due to the different advancement speeds of the support surface (2) and the accumulation belt (T1).

8. The method according to claim 7, wherein the layer (L) is spread on the support surface (2) and the decorative layer (3) is applied on the layer (L).

9. The method according to claim 7, comprising a step of applying a lower decorative layer (3) on the support surface (2), wherein the layer (L) is spread on the lower decorative layer (3).

10. The method according to claim 7, wherein the application of the decorative layer (3) takes place by means of a digitally controlled dispensing device (4).

11. The method according to claim 7, wherein the step of applying the decorative layer (3) on the layer (L) is performed by means of the dispensing device (4) and by producing a relative motion between the dispensing device (4) and the support surface (2).

12. The method according to claim 11, wherein the relative motion between the dispensing device (4) and the support surface (2) is produced by means of an advancement of the support surface (2).

13. The method according to claim 7, comprising a step of controlling and adjusting the moisture of the layer (L) before the pressing step.

14. The method according to claim 7, comprising a step of firing the layer (L) following the pressing step.

* * * * *